Figure 1:
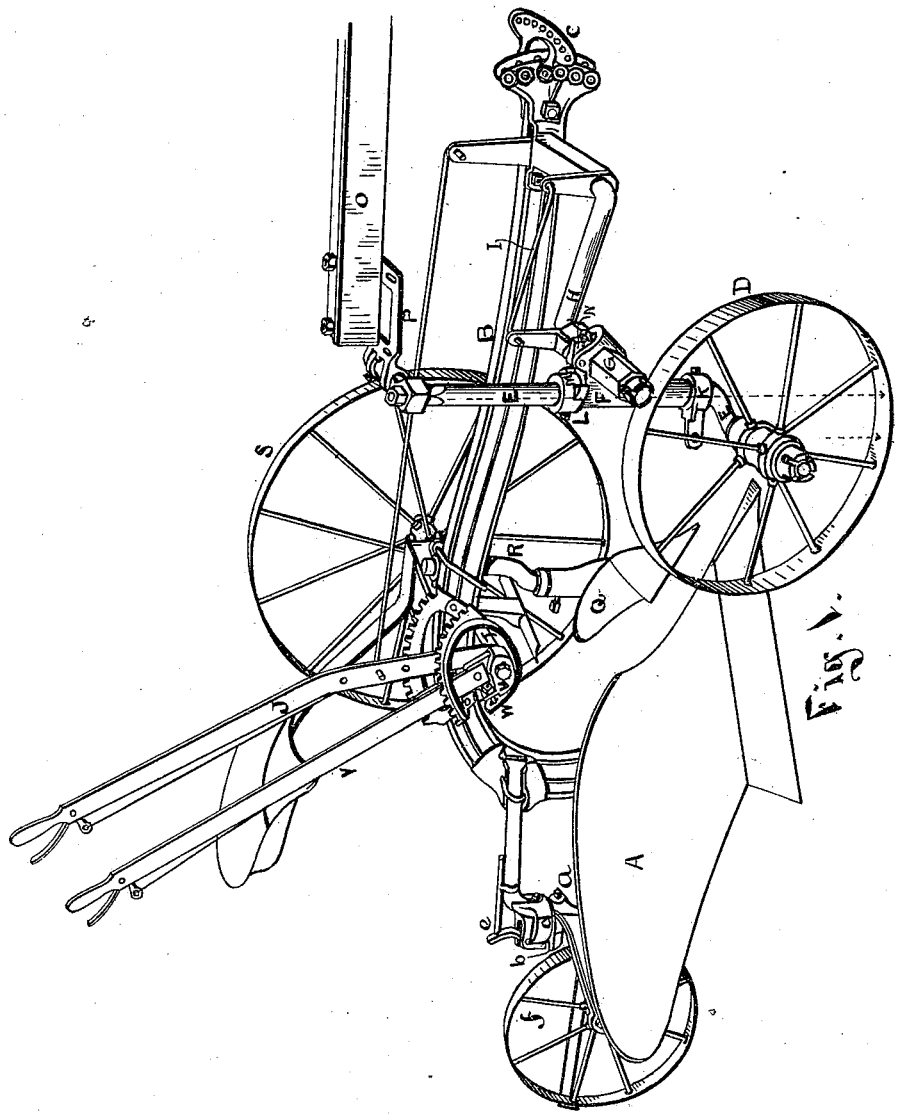

(No Model.) C. W. CLARK. 3 Sheets—Sheet 1.
PLOW.

No. 490,542. Patented Jan. 24, 1893.

Attest.
E. L. Buck
R. W. Smith

Inventor.
Chester W Clark
By his Atty
R. D. O. Smith

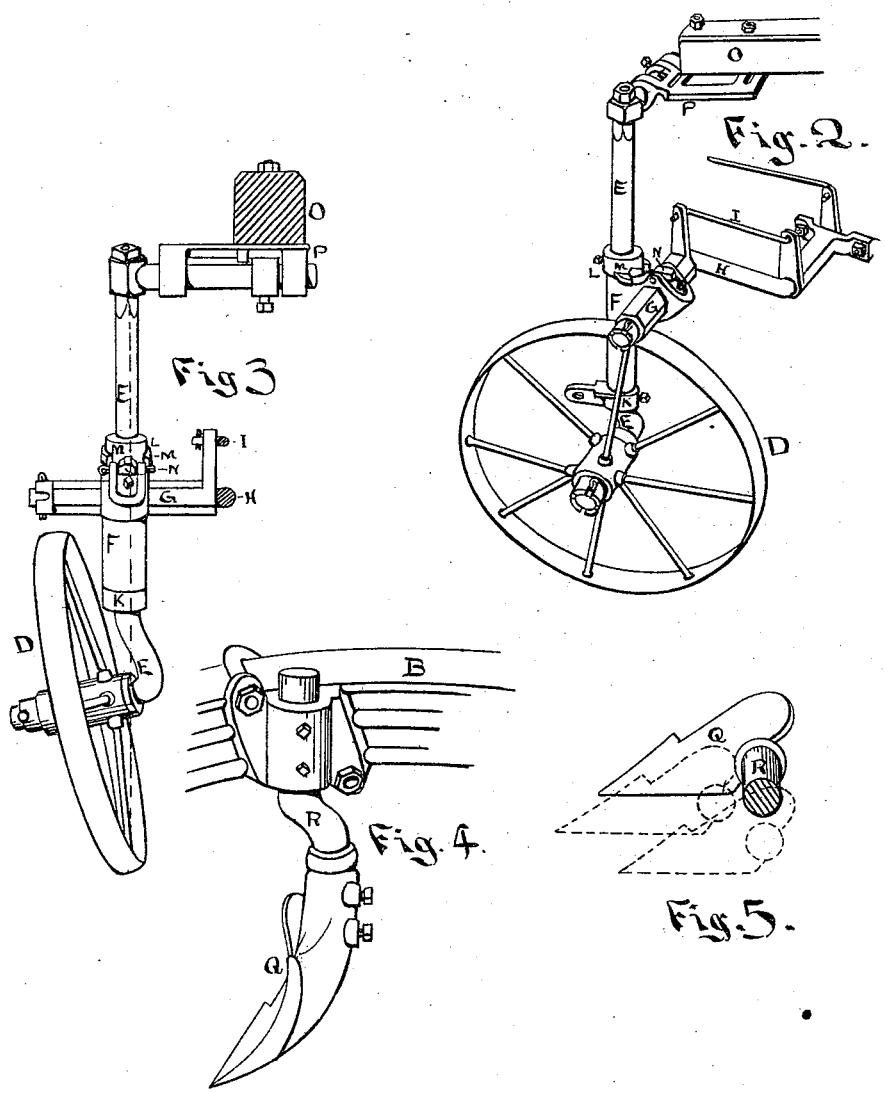

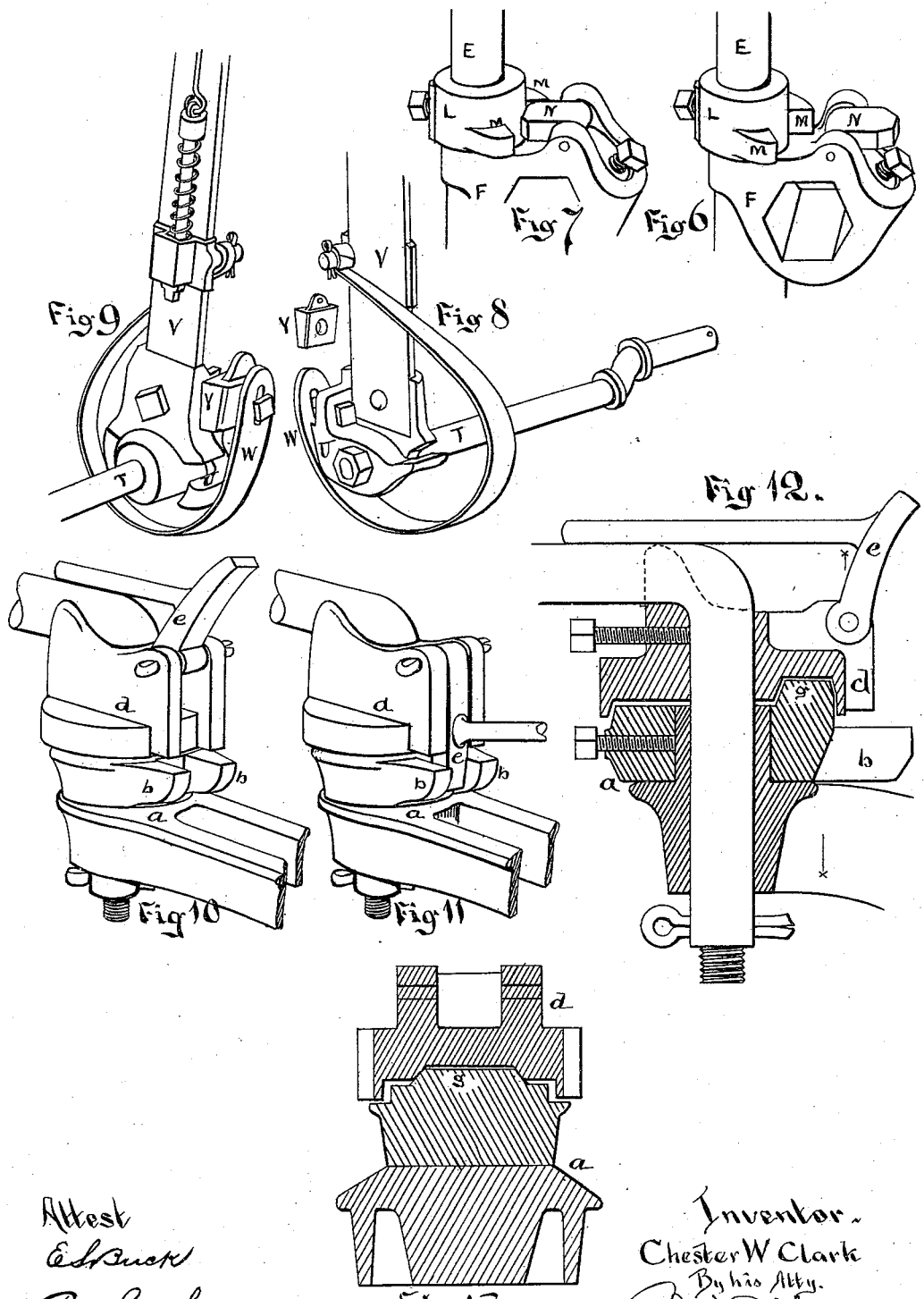

UNITED STATES PATENT OFFICE.

CHESTER W. CLARK, OF MISHAWAKA, INDIANA.

PLOW.

SPECIFICATION forming part of Letters Patent No. 490,542, dated January 24, 1893.

Application filed March 24, 1892. Serial No. 426,260. (No model.)

*To all whom it may concern:*

Be it known that I, CHESTER W. CLARK, of Mishawaka, in the county of St. Joseph and State of Indiana, have invented new and useful Improvements in Riding-Plows; and I do hereby declare that the following is a full and accurate description of the same, reference being had to the accompanying drawings, in which—

Figure 1 is a perspective view of my plow in operative condition. Figs. 2. 3 are perspective views of the leading wheel and attachments. Figs. 4. 5 are views of the jointer. Figs. 6. 7 are perspective views of the spindle latch. Figs. 8. 9 are perspective views of land wheel lever attachment and lock. Figs. 10. 11. 12. 13 are views of the rear wheel swivel attachment and lock.

This invention relates to improvements on the class of plows, for which Letters Patent No. 434,245 were granted me August 12, 1890 and it consists, first, in the leading wheel mounted upon a spindle to which the tongue is attached and means whereby the parallelism of said wheel will be preserved as it is raised or lowered. Second, in means whereby said leading wheel may be limited in its swing when uncontrolled by the tongue. Third in a plow jointer mounted on a crank standard whereby it may be adjusted laterally. Fourth in a land wheel crank axle with an adjusting lever and tension spring whereby said axle and wheel is permitted to yield through a limited space, and a wedge or other device which may be interposed to render rigid the connection between said lever and crank axle. Fifth, in a positive lock for the rear wheel in addition to the gravity automatic lock heretofore employed.

A is my plow which may be of some material and form suitable for the service for which it is designed.

B is an ordinary metallic plow beam to the rear end of which the plow A. is secured and provided at its front end with the draft clevis C.

The leading wheel D. is mounted upon an axle E which is slightly inclined from the horizon so as to cause the top of the wheel to lean outward and cause the tread of the wheel to be directed in line with the caster spindle and to follow in the bottom angle of the preceding furrow without scraping the side of the same. The axle spindle E is bent sidewise and upward to form a vertical spindle, the axis whereof, if prolonged downward, would intersect the rim of the wheel a little in advance of the lowermost bearing point of its tread as shown by the dotted line in Fig. 1. The effect of this is to cause the wheel D to follow as a caster wheel when free. The spindle E passes upward through a sleeve box F in which it turns and is maintained in a vertical position. The sleeve box F has on one side a projection, with an angular opening through it, for the passage of the sleeve G, and by sliding upon said sleeve G, the box F and wheel D may be adjusted laterally to adapt the same to the width of furrow being turned. The sleeve G is carried on the end of a crank rod H and is controlled by a parallel rod I and by a lever J and connecting rod. These controlling members as shown are the same as in my patent above named.

The vertical adjustment of spindle E in the sleeve F is secured by two movable collars K. L. with proper setscrews. The collar L is also provided with two lugs or studs M. M. and the sleeve F is provided with a pivoted latch N. which when turned over forward will lie between said studs and will limit the rotary movement of the spindle E and when thrown over backward will leave said spindle free and unobstructed. (See Figs. 1. 2. 3. 6. 7.)

In my patent above named the tongue is attached to a standard at the forward end of the plow beam. I now consider it preferable to control the plow by direct control of the leading wheel, rather than by pressure upon the plow frame. Therefore I mount my tongue plate P. upon the top of the spindle E and bolt the tongue O to said plate. A convenient way is that shown where a lateral arm is fitted with a socket and square to the top of the spindle E and the tongue plate P. mounted upon said arm. This renders the tongue easily removable if for any reason its use is not desired.

The plow's jointer Q is mounted upon the lower end of the cylindrical crank standard R. the upper end of which is securely held in a socket, bolted to the side of the plow beam. Said jointer may be rotated on the lower end of the standard R and said standard may be rotated in its retaining socket and by the union of these two rotations, the jointer may be adjusted laterally and to line as desired and securely fastened when in use.

The land wheel S. is mounted at the end of a crank axle T, the inner end of which is rigidly fastened to the cast head U. The lever V is also centered on said axle and is connected with the head U by a spring W whereby when said lever is locked to its segment the wheel S may have a limited amount of oscillation with its crank. This is as shown in my patent above named. But it frequently is desirable to restrain this freedom and to render the wheel rigid in its connection with the controlling lever. This I accomplish by the interposition of a block between the head U and spring W and behind the lever V. The most simple and effective device for this purpose is a simple wedge Y (see Figs. 8 and 9) though it is evident the member to be interposed may be attached to the lever or other suitable part by a pivot or as a slide.

In my patent above named the rear wheel is described as provided with a gravity lock whereby said wheel will be retained in the plane of advance under ordinary circumstances but permitted to depart from that plane when the plow is in the act of turning at a corner. It is found to be desirable to provide also a positive lock, so that when desired the position of the wheel may be made unchangeable in backing or other movements of the plow. For this purpose I provide the lower or swinging part $a$ of the pivot head with two projecting lugs $b$. $b$. and the upper or fixed part $d$ of said head is provided with a pivoted latch $e$ which when required may be turned down on its pivot pin and entered between said lugs $b$. whereby the lower part $a$. and the rear wheel $f$. are locked as to plane.

When the latch $c$. is not in action the stud $g$. resting in its cell in the opposite member of the spindle head of the rear wheel affords a gravity lock which will hold the parts in position as against the ordinary side strains incident to the advance of the plow, but upon turning at the corner said stud will automatically ride out of its notch and permit the wheel to swing like a caster wheel. This is explained in my patent above named.

Having described my invention I claim

1. In a wheeled plow a leading wheel, a spindle E for the same, a tongue O attached to the top of the said spindle, a crank H. to support and attach the same to the plow frame and means adapted to preserve the parallelism of said wheel spindle as said wheel is raised or lowered.

2. In a wheel plow, a leading wheel, a vertical spindle E, a tongue O attached to the top of said spindle, a crank H. and parallel rod I whereby said wheel and spindle may be raised or lowered in parallelism.

3. In a wheeled plow a leading wheel mounted upon a vertical spindle whose axis is in advance of the tread point of said wheel, and a tongue attached to the spindle of said wheel.

4. In a wheeled plow, the leading wheel D. and vertical spindle E bent at its lower end to constitute an axle for said wheel and so that the vertical axis of said spindle prolonged downward will cut the rim of said wheel a little in advance of its point of tread for the purpose set forth.

5. In a wheeled plow, the leading wheel D. provided with an axle attached to a vertical spindle in advance of its point of tread combined with a tongue plate P, adapted to receive a tongue O. for the purpose set forth.

6. A wheeled plow provided with a leading caster wheel and a tongue adapted to be attached to the caster wheel spindle for the purpose set forth.

7. The caster wheel D. the spindle E provided with lugs M. M. combined with the latch N, substantially as set forth.

8. The wheel D. the spindle E provided with the collars K. L., lugs M. M. combined with the sleeve box F and the latch N. pivoted to said box substantially as set forth.

9. In a wheeled plow a jointer Q mounted upon a cranked standard R. seated at its lower end in a socket plate attached to the mold board of said jointer and set screws to fasten the same in position thereon whereby said jointer is adjustable laterally for the purpose set forth.

10. In a wheeled plow a land wheel, a crank axle for the same, an adjusting lever and a tension spring interposed between said lever and axle, combined with means whereby said yielding connection may be made rigid at will.

11. In a wheeled plow, a land wheel, a crank axle for the same, an adjusting lever attached to said axle with a certain range of lost motion and a tension spring whereby said land wheel is rendered yielding within said range, combined with a device adapted to be interposed at will to prevent said yield and render the connection rigid between said axle and lever.

12. In a wheeled plow, a land wheel S., a crank axle T for the same, an adjusting lever V and tension spring W combined with a block Y as and for the purpose set forth.

13. In a wheeled plow a rear wheel $f$ provided with an automatic gravity lock $g$ substantially as described, combined with means whereby said lock may be rendered rigid and positive at will.

14. In a wheeled plow a rear wheel $f$ provided with a spindle head in two parts $a$. and $d$. whereof one part is provided with an inclined sided locking stud $g$ and the other side is provided with a corresponding recess, combined with the studs $b$. $b$. projecting from the part $a$. and the pivoted latch $e$.

CHESTER W. CLARK.

In presence of—
JOSEPH H. STOCKBERGER,
HENRY GILBERT.